United States Patent [19]

Schramm et al.

[11] Patent Number: 5,166,594
[45] Date of Patent: Nov. 24, 1992

[54] BATTERY CHARGING SYSTEM WITH FAULT INDICATION

[75] Inventors: Günter Schramm, Vaihingen-Enzweihingen; Edgar Kuhn, Gerlingen; Rainer Mittag, Kornwestheim, all of Fed. Rep. of Germany

[73] Assignee: Robert Bosch GmbH, Stuttgart, Fed. Rep. of Germany

[21] Appl. No.: 700,123

[22] PCT Filed: Oct. 25, 1989

[86] PCT No.: PCT/DE89/00681
    § 371 Date: May 24, 1991
    § 102(e) Date: May 24, 1991

[87] PCT Pub. No.: WO90/07815
    PCT Pub. Date: Jul. 12, 1990

[30] Foreign Application Priority Data

Dec. 31, 1988 [DE] Fed. Rep. of Germany ....... 3844442

[51] Int. Cl.⁵ .............................. H02J 7/14; H02J 7/16
[52] U.S. Cl. .................................. 320/28; 320/29; 322/28; 322/99
[58] Field of Search ............... 320/28, 64; 322/29, 322/99, 28; 361/18, 153, 187, 23, 33

[56] References Cited

U.S. PATENT DOCUMENTS

| | | | |
|---|---|---|---|
| 3,983,471 | 9/1976 | Itoh et al. | 322/28 |
| 4,477,766 | 10/1984 | Akita et al. | 322/28 |
| 4,670,705 | 6/1987 | Sievers et al. | 322/28 |
| 4,755,734 | 7/1988 | Komurasaki et al. | 322/28 |

FOREIGN PATENT DOCUMENTS

| | | |
|---|---|---|
| 1538313 | 4/1969 | Fed. Rep. of Germany . |
| 2005600 | 12/1969 | France . |
| 2476406 | 12/1980 | France . |
| 2479592 | 10/1981 | France . |

*Primary Examiner*—Steven L. Stephan
*Assistant Examiner*—Ben Davidson
*Attorney, Agent, or Firm*—Michael J. Striker

[57] ABSTRACT

The battery charging system includes a generator, a rectifier system with main diodes and exciter diodes as well as two terminals (B+, D−) for battery charging, at least one terminal (D+) for consuming points, a voltage regulator (14) for a generator output voltage, a charging control light (16) and a fail-safe device (15) structured to indicate faults and for protection from excess voltages. The fail-safe device includes an additional voltage regulating device (17) connected electrically to the generator and a relay (27) connected with the additional voltage regulating device. The fail-safe device also can include three voltage dividers (82, 83, 84; 70,71; 48,49) to provide different adjustable voltage thresholds, four Zener diodes (20 to 23) connected across terminals (D+ and D−) for limiting voltage, a pulse generator and a delay stage (19) structured and connected so that the additional voltage regulating device (17) regulates the generator output voltage, when an excess voltage occurs or a defective connection is present in the voltage regulator.

8 Claims, 2 Drawing Sheets

BATTERY CHARGING SYSTEM WITH FAULT INDICATION

The present invention relates to a battery charging system and, more particularly, to a battery charging system for a motor vehicle battery, which is part of a motor vehicle and which indicates opertional faults.

A battery charging system of the above described type is known comprising a generator having generator terminals, a rectifier system connected with the generator and having main diodies and exciter diodes as well as two terminals (B+, D−) for connection of at least one battery to be charged, at least one terminal (D+) for consuming points, a voltage regulator (14) connected to the generator for controlling a generator output voltage of the generator, a charging control light and means connected to the generator for recognition and indication of faults by the charging control light and for protection from excess voltages.

Battery charging systems are known in which several possible faults can be indicated and which can when a fault occurs be switched to an emergency function, for instance an emergency control. A battery charging system is thus for instance known from DE-OS 30 06 109 wherein the electrical battery to be charged is supplied by an alternating current generator containing an exciter coil and a rectifier, a semi-conductor voltage regulator is provided to keep the generator voltage constant. When the generator voltage exceeds or falls below a given value, this is indicated by a charging control device.

The indication of faults gives the user timely warning. Consequential damage therefore, for instance boiling dry of the battery or failure of the entire electrical installation of the motor vehicle, is thereby avoided. In the device described in DE OS 30 06 109 an emergency control comes into operation when the connection between the generator and the battery is interrupted, preventing too sharp an increase of the generator output voltage.

This battery charging system has however the disadvantage that although the fault "defective connection in regulator" is indicated, no emergency control can take place in this case.

SUMMARY OF THE INVENTION

It is an object of the present invention to provide an improved battery charging system with fault indicator, which avoids the disadvantages described above.

This object, and others which will be made more apparent hereinafter, are attained in a battery charging system with fault indication, particularly for a motor vehicle, comprising a generator with generator terminals, a rectifier system connected to the generator with main diodes and exciter diodes as well as terminals (B+,D−) for connection of at least one battery to be charged, at least one terminal (D+) for connection of consuming points, a voltage regulator for control of the generator output voltage and a charging control light and means for recognition of faults and indication of the faults by charging control light and for protection of the battery charging system from excess voltages.

According to the invention, the means for recognition of faults and protection includes an additional voltage regulating device, which is independent of the voltage regulator and operates in place of the voltage regulator, when there is a defective connection in the voltage regulator.

A switching means, advantageously a relay, is provided in a fail-safe device and connected to the voltage regulating device which is also in the fail-safe device. The fail-safe device is designed so that, when an excess voltage occurs or a defective connection is present in the voltage regulator, the additional voltage regulating device operates to control the generator output voltage.

The battery charging system in accordance with the invention, has on the contrary the advantage that it indicates a multiplicity of faults in the battery charging system by the charging control device and at the same time permits an emergency control by an auxiliary or additional regulator which is part of a fail-safe device.

The blinking of the charge control light signals the fault to the user of the vehicle. Since however the additional or emergency control ensues at the same time, the user of the motor vehicle has time to seek the nearest workshop. If the charging control light were not used to indicate the fault, damage might result because of the existence of the fault since the driver will not otherwise know the fault has occurred.

The fail-safe device also can incude three voltage dividers (82, 83, 84; 70,71; 48,49) connected across the terminals (D+ and D−) to provide different adjustable voltage thresholds, four Zener diodes (20 to 23) connected across terminals (D+ and D−) for limiting voltage, a pulse generator and and a delay stage (19).

BRIEF DESCRIPTION OF THE DRAWING

An embodiment of the invention is shown in the drawing and explained in greater detail in the subsequent description.

DESCRIPTION OF A PREFERRED EMBODIMENT

Figure 1:
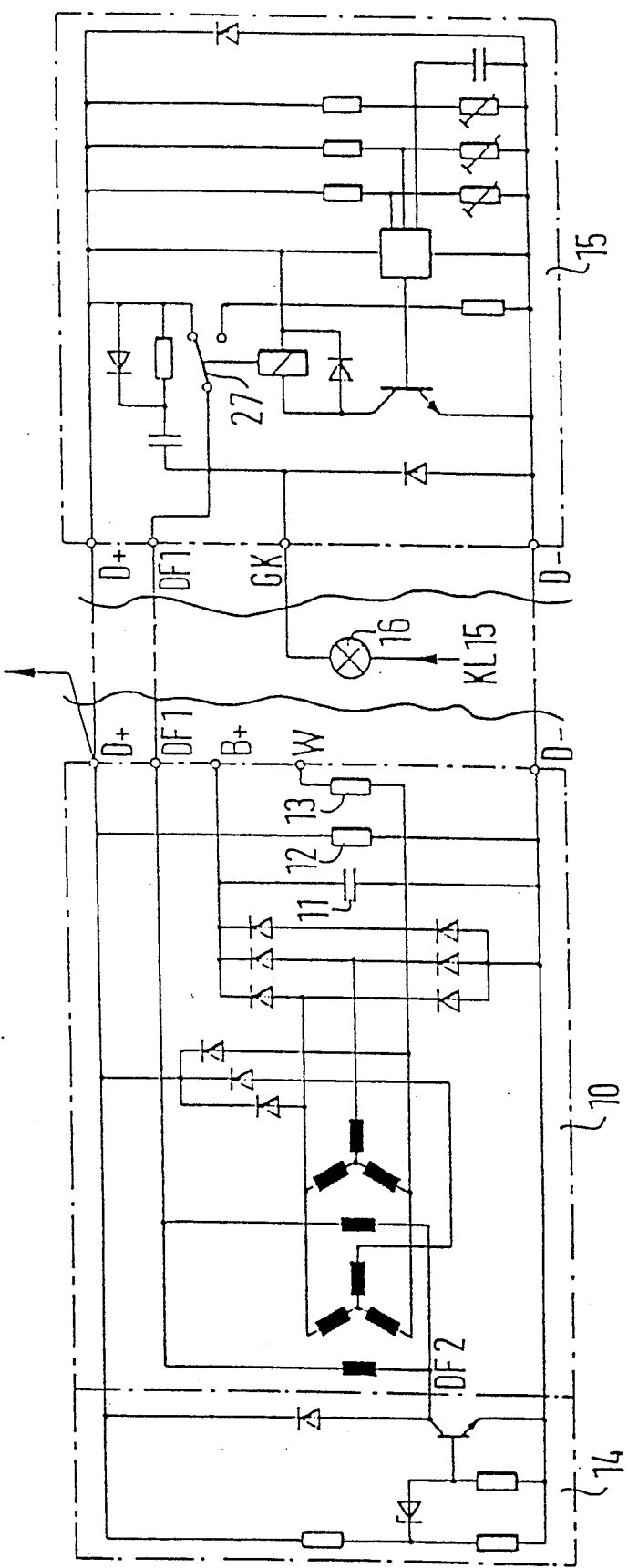
FIG. 1 is a circuit diagram of the battery charging system as a whole with the facilities for connecting the fail-safe device of the invention and, FIG. 2 is the circuit diagram of the fail-safe device.

A known alternator system 10 as shown in FIG. 1 as a double generator T1-28V110/180A with six stators and two sets of field windings has terminals D+, DF1, B+, W, D− and DF2. In addition to the known circuit which will not be described in greater detail here, a condenser 11 is connected between terminals B+ and D−, a resistor 12 between D+ and D−, and a resistor 13 between terminal W of the generator and the low voltage side of the stator winding. A known voltage regulator 14 is connected to the alternator system 10 through the terminals D+, DF2 and D− to control the generator output voltage.

The fail-safe device 15 is connected by leads to the generator terminals D+, DF1 and D−. The fail-safe device further has another terminal GK to which is attached a charging control light 16 which is connected to a terminal KL15 of the generator.

Additional consuming points can be connected to the generator terminal D+. The battery which is not shown is situated in accordance with common practice between the generator terminals B+ and D−.

Figure 2:
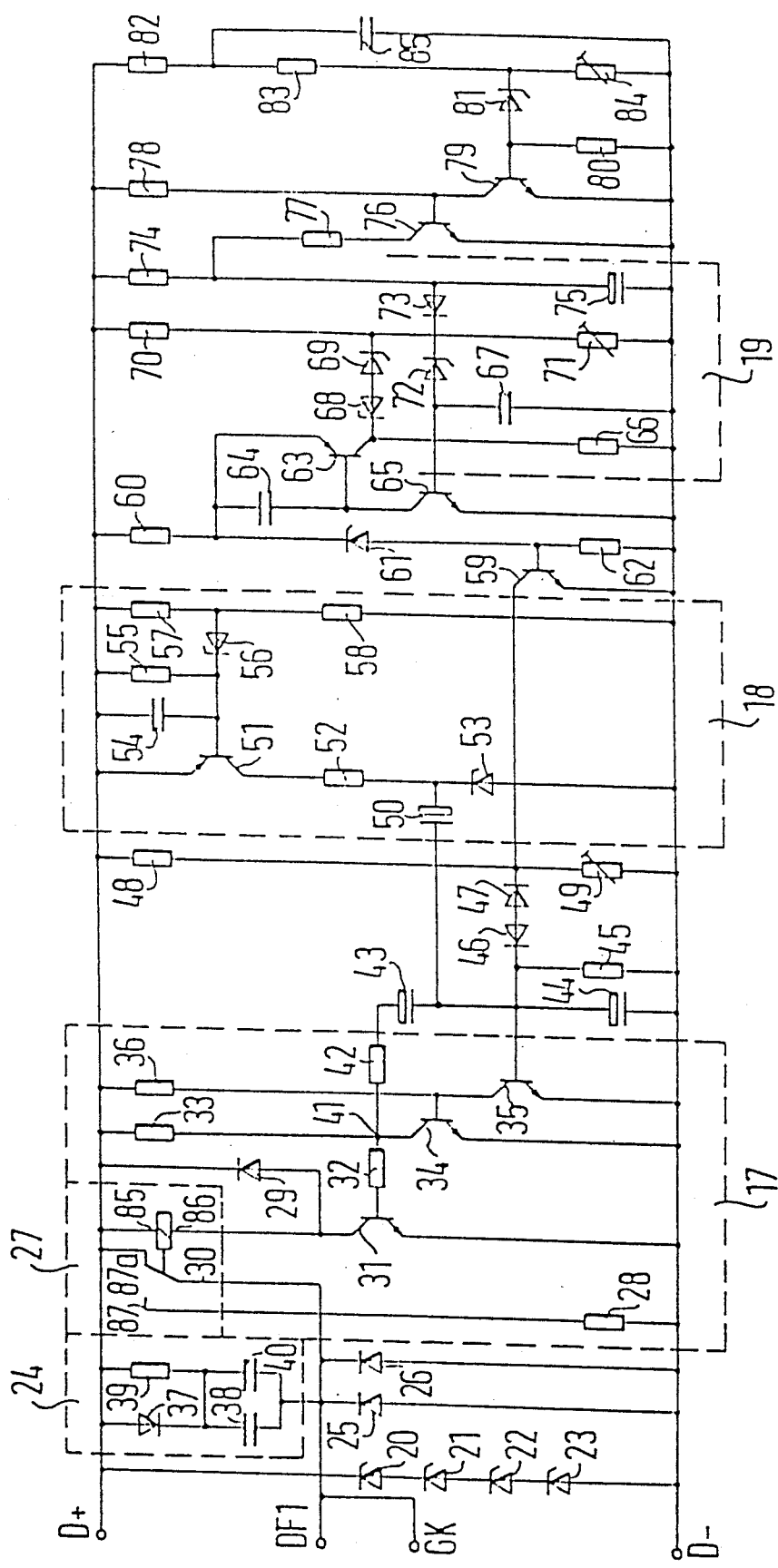

The detailed circuit arrangement of the fail-safe device 15 is shown in FIG. 2.

FIG. 2 shows the fail-safe device with the terminals D+, DF1, GK, and D−. The fail-safe device shown in FIG. 2 comprises three component assemblies each of which is connected between the terminals D+ and D—, namely a fail-safe regulator 17, a pulse generator (pulser) 18 and a delay stage 19. In addition further components are provided which are described in the subsequent description.

Four Zener diodes 20 to 23 are mounted in series between terminals D+ and D— to ensure a limitation of the voltage at D+. A component assembly 24 and a diode 25 are furthermore provided in series between terminals D+ and D—, a further diode 26 being located parallel to the diode 25. The cathodes of the diodes 25 and 26 are at the same time additionally connected to the terminal DF1 and to a relay 27 which again is located at D+.

Relay 27 has five contacts which are designated by the reference numbers 30, 86, 85, 87 and 87a. The terminal 87 is at the same time connected to D— through a resistor 28 and the terminal 30 of relay 27 is connected to DF1. The designations of the terminals of relay 27 are those in common practice. Terminal 87a and terminal 85 of relay 27 are connected to D+ while terminal 86 is connected through a diode 29 to D+, as well as through a transistor 31, to D—. Terminal 86 is located at the collector of transistor 31 while the emitter of transistor 31 is connected to D—. The base of transistor 31 is connected through a resistor 32 and a resistor 33 to D+ and beside this through a transistor 34 to D—, whereby the base of the transistor 34 is connected to the collector of a further transistor 35 whose emitter again is connected to D—. A further resistor 36 is connected between the base of transistor 34 and D+.

The relay 27 and the components 28 to 36 form the fail-safe regulator.

The component assembly 24 contains a diode 37 and a condenser 38 connected in series. A resistor 39 and a condenser 40 connected in series are connected in parallel to the diode 37 and the condenser 38 The cathode of diode 37 is provided with the junction between the resistor 39 and the condenser 40.

The fail-safe regulator 17 is located with its junction 41 between the resistor 32. The junction 41 the collector of the transistor 34 and is connected to D— through a resistor 42, a condenser 43 and a further condenser 44 connected in series. A resistor 45 is at the same time located parallel to the condenser 44. The base of the transistor 35 is connected through a diode 46 and a Zener diode 47 mounted in series to the central tap of a voltage divider 48, 49. The resistor 49 is variable and a series connection of 46 and 47 is made in such a manner that the anodes are in each case connected with each other.

The base of the transistor 35 is further connected through the diodes 46, 47 connected in series, to a transistor 51, a resistor 52 and a Zener diode 53 connected in series and which are for their part again located between the terminals D+ and D—, A further condenser 50 is connected between the cathode of the Zener diode 53 and a junction between the condensers 43, 44.

A condenser 54, a resistor 55 and the series consisting of a Zener diode 56 and a resistor 57 are located in parallel to the base-emitter circuit of the transistor 51, The junction between the resistor 57 and the Zener diode 56 is connected to D— through a resistor 58.

The components 48 to 58 form the pulser 18.

The collector of a further transistor 59 is connected to the voltage divider 48, 49, the emitter of this transistor is connected to D—, the base to a resistor 60, a Zener diode 61 and a resistor 62 connected in series between D+ and D—. A transistor 63 is connected between the resistor 60 and the Zener diode 61, in the base-emitter circuit of which is located a condenser 64 and the collector of which is connected to the base of a further transistor 65 the collector of which is again connected to the base of transistor 63 and the emitter of which is connected to D—. A resistor 66 and a condenser 67 connected in parallel are located between the junction of the collector of transistor 63 and the base of transistor 65 as well as D—. This junction is further connected through a diode 68 and a Zener diode 69. Connected in series to a voltage divider 70, 71 located between D+ and D—. The resistor 71 is variable.

The junction is further connected to D+ through a Zener diode 72 and a diode 73 connected in series with it and a resistor 74 to D+, and through the series-connected Zener diode 72 and diode 73 and a condenser 75 to D—.

The collector of a further transistor 76 is connected to D+ through the resistor 77 and the resistor 74. The base of transistor 76 is likewise connected to D+ through the resistor 78. This base is in addition located at the collector of transistor 79 the emitter of which is connected to D—.

The base of transistor 79 is connected through the resistor 80 directly to D— and through the Zener diode 81 to the voltage divider 82, 83 and 84 located between D+ and D—. A filter capacitor 85 is connected in parallel across the resistors 83 and 84. The resistor 84 again is variable.

The resistors 82, 83 and 84, 70 and 71, and 48 and 49 respectively form three variable voltage dividers which will hereinafter be called voltage divider 1, voltage divider 2 and voltage divider 3 respectively.

Functioning of the Fail-safe Device (FSG15)

The fail safe device is connected to the generator at D+, DF1 and D—. The charging control light which takes over the indication in the case of a fault is connected to the fail-safe device (connection GK). The current of the exciter coil flows from D+gen to D+fail-safe-device through the home contact of relay 27, from the terminal DF1 of the fail-safe device to DF1 generator. This terminal is connected to the exciter coil. The other side of the exciter coil (DF2) leads to the output stage of the electronic regulator 14. The pre-exciter current flows from KL15, through the control light 16, GK and DF1 to the generator.

The fail-safe device comprises three differently set voltage thresholds which monitor the voltage at D+gen. They are produced at the voltage dividers 82, 83, 84 and 70,71 and 48,49 respectively. The following malfunctions of the battery charging system are recognized by the fail-safe device, with protection being given against these malfunctions at the same time:

1. Defective connection in regulator, limitation of the generator voltage and fault indication.

If the voltage at D+ increases in consequence of full excitation of the generator (for example due to a defective connection in the regulator), this condition is recognised by the voltage divider 82, 83, 84 and the transistor 79 is activated to turn on. This makes the transistor 76 turn off and the condenser 75 is charged through resistor 74. If the voltage at the condenser 75 has reached the value $U_{73}+U_{72}+U_{BE65}$, the transistors 63 and 65 turn on.

This state of transistors 63 and 65 is maintained (until the vehicle or the generator are brought to a standstill by the ignition being switched off). The transistor 59 thereby goes from the "on" to the "off" state and releases the voltage divider 3. Transistor 35 turns on, 34 off, 31 turns on, the relay is excited and the connection between D+ and the exciter field is interrupted. The generator voltage at D+ drops. At the same time the control light lights up through resistor 28. If the voltage falls below a certain value, transistor 35 turns off, transistor 34 turns on, transistor 31 turns off and the relay is released again. This closes the contact 87a/30 and the exciter current flows again from D+ through DF1 to the exciter field. This causes the voltage at D+ to increase again, the control light going out at the same time. If a certain voltage is exceeded again, the relay closes again in the same manner as described above. The relay takes over the function of the electronic regulator. This ensures the charging of the vehicle battery or the power supply to the consuming points when there is a defective connection in the regulator. A fault in the power supply in the vehicle electrical system is indicated by the blinking of the charging control light.

The exciter current flows through the relay contact 87a/30. The transition resistance of the contacts increases due to dirt and oxidation (extreme case: interruption of contact). To avoid this, the relay is activated during each start-up process of the vehicle which causes the contact to be briefly actuated several times (seen as blinking of the control light). This achieves cleaning of the contact.

The corresponding part of the circuit is the pulser 18. If the voltage $U_{56}+U_{BE51}$ across the resistor 57 is reached, the transistor 51 turns on. This causes current to flow momentarily to the base of transistor 35. Transistor 35 turns on, transistor 34 turns off, transistor 31 turns on and opens the exciter circuit. The voltage UD becomes smaller, transistor 51 turns off, transistor 35 turns off, transistor 34 turns on, transistor 31 turns off, and the exciter current can flow, $U_{D+}$ increases, transistor 51 turns on again, transistor 35 turns on likewise.

Since the remanence of the generator increases, after a short time the voltage at D+ no longer drops below the value set by means of the resistors 57, 58. Transistor 51 remains on, condenser 50 is charged to its terminal value and uncouples the base of transistor 35 from transistor 51. Transistors 35 and 31 remain off, the electronic regulator 14 takes over the control function of the installation. Diode 53 limits the voltage across condenser 50.

A filter capacitor 95 is provided in order that the voltage peaks or ripples of the generator voltage, which—when the regulator is unimpaired—arise principally during operation without the battery, do not disengage the above safety function.

To avoid battery overloaded, the resolution sensitivity of the voltage (at D+) for the disengagement of the safety function, when there is a defective connection in the regulator, is allowed to be only slightly above the normal control voltage. The capacitor 95 is however already charged at a relatively high voltage before the fault has arisen. In order that no response ensues in the case of the above voltage peaks, a relatively large and therefore, because of the required voltage stability, very expensive capacitor would have to be used.

The size of the capacitor 95 can be kept small by means of an additional delay stage 19.

If due to the voltage peaks transistors 79 turned on and transistor 76 turned off, an additional condenser 75 would have to be charged through resistor 74 to the relatively high voltage of the Zener diode 72 before the safety function was disengaged. The circuit must have such dimensions that the time of the momentary excess voltages is shorter than the time required by the condenser 75 to reach the Zener voltage of Zener diode 72.

It is advantageous that after the voltage peaks have decayed the condenser 75 is rapidly discharged again through resistor 77 and transistor 76, so that no adding up of the voltage results at condenser 75 due to periodic voltage peaks.

2. Operating without battery—defective connection in control unit ("double fault" which can hardly occur).

The voltage at D+ normally increases when there is a defective connection in the regulator (depending on $U_{gen}$ and $I_{gen}$). When the voltage at D+<50 V, "contact control" (see Point 1) is switched on through the "fail-safe device" (voltage divider 1) and consequently with a certain delay.

When $U_{D+} > 50$ V, the contact regulator is switched on practically without delay through voltage divider 2. Instantaneous switch-on through voltage divider 2 when $U_{D+} > 50$ V results in advantages when the load is switched off without the battery (see Point 3).

The measures mentioned result in a limitation of the generator voltage and fault indication.

3. Operating without battery when regulator is functioning, indication of operating condition "operating without battery"

Indication "operating without battery" and a switchover to the contact control ensues when the voltage at $U_{D+} > 50$ V. In practice a voltage rise at D+ occurs when the load is switched off. In the case of failure of the main generator-battery lead, a voltage rise occurs automatically since the load current of the battery is switched off.

The indication accordingly depends on the generator speed and on the current switched off.

The indication could be made more "sensitive" by reducing the threshold of 50 V, but there is then the danger that due to momentary voltage peaks the contact control and consequently the indication will be switched on even when operating with the battery.

As mentioned above, switching off the load without the battery produces an excess voltage at D+ which is recognised by the voltage divider 2. If the voltage at resistor 71 rises above the value of $U_{69}+U_{68}+U_{BE65}$, transistors 63 and 65 turn on. This switching state of transistors 63 and 65 is maintained (until the vehicle or the generator have come to a standstill due to the ignition being switched off). The transistor 59 thereby switches from the "on" to the "off" state and releases the voltage divider 3. Transistor 35 turns on, transistor 34 turns off, transistor 31 turns on, the relay is excited and the connection between D+ and the exciter field is interrupted. The voltage at D+ drops. At the same time the control light 16 comes on through resistor 28. If the voltage drops below a certain value transistor 35 turns on, transistor 34 turns on, transistor 31 turns off, and the relay is again released. The contact 87a/30 closes again and the exciter current flows to the exciter field. This causes the voltage at D+ to rise (the control light goes out at the same time).

If the voltage set at the voltage divider 3 is exceeded, the relay switches on again in the same manner as previously described. The relay takes over the function of the electric regulator.

Depending on the generator speed and the height of the load current switched off, the familiar voltage peaks and "hard" voltages can occur at D+ until the exciter current is interrupted (by the relay contact).

Since the case of voltages which are higher than the control voltage of the electronic regulator the output stage of this regulator is shut off, the arising voltage peaks would destroy the regulator if they are above the maximum shut off voltage of the output stage.

Diodes 20 to 23 limit the maximum voltage to a permissible value.

4. Operating without battery, regulator O.K. "Limitation" of excess voltage when load is switched off without the battery.

As already explained in Point 3, the momentary voltage peaks, which occur when the load is switched off without the battery, are limited to 250 V by the Zener diodes 20 to 23.

Consuming points in the vehicle can be destroyed by "hard" voltage which likewise occurs when the load is switched off without the battery. With the fail-safe device a reduction of the hard voltage takes place.

By means of a free-running diode mounted directly in parallel with the exciter field, excess voltages at D+ can be reduced to those without the fail-safe device. However, voltages corresponding to those without the fail-safe device would then again occur at the same time at B+.

While the invention has been illustrated and described as embodied in a battery charging system with fault indication, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. In a battery charging system with fault indication, particularly for a motor vehicle, comprising a generator having generator terminals, a rectifier system connected with the generator and having main diodies and exciter diodes as well as two terminals (B+,D−) for connection of at least one battery to be charged, at least one terminal (D+) for consuming points, a voltage regulator (14) connected to the generator for controlling a generator output voltage of the generator, a charging control light and means connected to the generator for recognition and indication of faults by the charging control light and for protection from excess voltages, the improvement comprising an additional voltage regulating device (17) and switching means connected with the voltage regulating device (17), said switching means being independent of the voltage regulator (14), said voltage regulating device (17) and switching means being structured and connected in the means for recognition of faults and for protection from excess voltages so that the additional voltage regulating device (17) regulates the generator output voltage, when one of an excess voltage occurs and a defective connection is present in said voltage regulator; and wherein said means for recognition of faults and for protection from excess voltages consists of a fail-safe device (15) including the additional voltage regulating device (17) with the terminals (D+, DF, D−) connected electrically to the generator terminals.

2. The improvement as defined in claim 1, wherein the switching means comprises a relay (27).

3. The improvement as defined in claim 1, wherein the fail-safe device (15) includes at least one Zener diode (20 to 23) and has connected electrically between the terminals (D+ and D−) said at least one Zener diode (20 to 23) for limiting voltage.

4. The improvement as defined in claim 1, wherein the fail-safe device (15) has three voltage dividers (82, 83, 84; 70,71; 48,49) which are each connected electrically between the terminals (D+ and D−) and which are each structured and connected so as to provide three different adjustable voltage thresholds of the fail-safe device.

5. The improvement as defined in claim 1, wherein the fail-safe device (15) has a pulse generator connected to the switching means so that the switching means can be activated for contact cleaning.

6. The improvement as defined in claim 1, wherein the fail-safe device is structured so that the voltage regulating device (17) effects the voltage regulation when a defective connection is present in the voltage regulator (14).

7. The improvement as defined in claim 6, wherein the charging control light (16) indicates operation of the voltage regulating device (17).

8. The improvement as defined in claim 1, wherein the fail-safe device (15) includes a delay stage (19).

* * * * *